United States Patent
Seo et al.

(10) Patent No.: US 10,841,038 B2
(45) Date of Patent: Nov. 17, 2020

(54) METHOD FOR TRANSMITTING/RECEIVING CONTROL INFORMATION IN WIRELESS COMMUNICATION SYSTEM AND APPARATUS FOR SAME

(71) Applicant: LG ELECTRONICS INC., Seoul (KR)

(72) Inventors: Inkwon Seo, Seoul (KR); Kijun Kim, Seoul (KR); Joonkui Ahn, Seoul (KR)

(73) Assignee: LG ELECTRONICS INC., Seoul (KR)

(*) Notice: Subject to any disclaimer, the term of this patent is extended or adjusted under 35 U.S.C. 154(b) by 79 days.

(21) Appl. No.: 16/082,502

(22) PCT Filed: Mar. 27, 2017

(86) PCT No.: PCT/KR2017/003257
§ 371 (c)(1),
(2) Date: Sep. 5, 2018

(87) PCT Pub. No.: WO2017/171327
PCT Pub. Date: Oct. 5, 2017

(65) Prior Publication Data
US 2019/0028234 A1    Jan. 24, 2019

Related U.S. Application Data

(60) Provisional application No. 62/314,367, filed on Mar. 28, 2016.

(51) Int. Cl.
*H04L 27/00* (2006.01)
*H04L 1/00* (2006.01)
(Continued)

(52) U.S. Cl.
CPC .......... *H04L 1/0038* (2013.01); *H04L 1/1861* (2013.01); *H04L 5/005* (2013.01);
(Continued)

(58) Field of Classification Search
CPC ............ H04L 27/2676; H04L 27/2649; H04L 5/0053; H04L 5/0007; H04L 5/0048; H04L 5/0091; H04L 1/0038
See application file for complete search history.

(56) References Cited

U.S. PATENT DOCUMENTS 9,344,259 B2 * 5/2016 Love ..................... H04L 5/0091
9,871,636 B2 * 1/2018 Chen ..................... H04L 5/0053
(Continued)

FOREIGN PATENT DOCUMENTS

WO    2011160280    12/2011

OTHER PUBLICATIONS

PCT International Application No. PCT/KR2017/003257, Written Opinion of the International Searching Authority dated Jun. 23, 2017, 18 pages.

*Primary Examiner* — Hanh N Nguyen
(74) *Attorney, Agent, or Firm* — Lee Hong Degerman Kang Waimey

(57) ABSTRACT

A method for receiving control information by a terminal in a wireless communication system according to one embodiment of the present disclosure may comprise the steps of: receiving a reference signal through at least one of multiple antenna ports of a base station; and blind-detecting control information of the terminal on the basis of at least one of a first transmission scheme using a single antenna port for the reference signal and a second transmission scheme using the multiple antenna ports for the reference signal, wherein a resource area for the first transmission scheme may overlap at least partially with a resource area for the second transmission scheme and, when the terminal performs blind-detection on the basis of the first transmission scheme, the terminal may perform the blind-detection on an assumption that the reference signal is transmitted according to the
(Continued)

second transmission scheme in the overlapping resource area.

14 Claims, 13 Drawing Sheets

(51) Int. Cl.
*H04L 5/00* (2006.01)
*H04L 1/18* (2006.01)
*H04W 72/04* (2009.01)
*H04L 27/26* (2006.01)
*H04B 7/06* (2006.01)

(52) U.S. Cl.
CPC .......... *H04L 5/0048* (2013.01); *H04L 5/0053* (2013.01); *H04W 72/042* (2013.01); *H04W 72/0446* (2013.01); *H04B 7/0689* (2013.01); *H04L 5/001* (2013.01); *H04L 27/2602* (2013.01)

(56) References Cited

U.S. PATENT DOCUMENTS

| | | |
|---|---|---|
| 9,883,497 B2* | 1/2018 | Chen ..................... H04L 5/0053 |
| 10,285,170 B2* | 5/2019 | Nam ..................... H04L 5/0048 |
| 2011/0222491 A1* | 9/2011 | Vajapeyam ........... H04L 1/0038 370/329 |
| 2014/0321414 A1 | 10/2014 | Chun et al. |
| 2015/0043496 A1 | 2/2015 | Kim et al. |
| 2016/0037498 A1 | 2/2016 | Chen et al. |
| 2016/0043843 A1 | 2/2016 | Liu et al. |

* cited by examiner (a)

(b)

METHOD FOR TRANSMITTING/RECEIVING CONTROL INFORMATION IN WIRELESS COMMUNICATION SYSTEM AND APPARATUS FOR SAME

CROSS-REFERENCE TO RELATED APPLICATIONS

This application is the National Stage filing under 35 U.S.C. 371 of International Application No. PCT/KR2017/003257, filed on Mar. 27, 2017, which claims the benefit of U.S. Provisional Application No. 62/314,367, filed on Mar. 28, 2016, the contents of which are all hereby incorporated by reference herein in their entirety.

TECHNICAL FIELD

The following description relates to a wireless communication system, and more particularly, to a method for receiving or transmitting downlink control information of a user equipment and an apparatus therefor.

BACKGROUND ART

As more communication devices require greater communication capacity, the need of mobile broadband communication more enhanced than the conventional RAT (radio access technology) has been issued in a next generation communication system discussed recently. Also, massive MTC (Machine Type Communications) technology that provides various services anywhere and at any time by connecting a plurality of devices and things is one of main issues which will be considered in next generation communication. Furthermore, considering service/UE susceptible to latency and reliability, URLLC (Ultra-Reliable and Low Latency Communication) has been discussed in a next generation communication system.

As described above, a New RAT considering eMBB, mMTC and URLCC has been discussed for next generation wireless communication.

DISCLOSURE

Technical Problem

The present disclosure has a technical object to provide a method and apparatus for transmitting and receiving control information more efficiently in a new radio access technique (RAT).

The technical objects that can be achieved through the present disclosure are not limited to what has been particularly described hereinabove and other technical objects not described herein will be more clearly understood by persons skilled in the art from the following detailed description.

Technical Solution

According to one aspect of the present disclosure, there is provided a method for receiving control information by a user equipment in a wireless communication system, the method comprising: receiving a reference signal via at least one of multiple antenna ports of a base station; and performing blind detection for control information of the user equipment based on at least one of a first transmission scheme in which a single antenna port is used for the reference signal and a second transmission scheme in which multiple antenna ports are used for the reference signal, wherein a resource region for the first transmission scheme overlaps at least partially with a resource region for the second transmission scheme, wherein when the user equipment performs the blind detection based on the first transmission scheme, the user equipment performs the blind detection by assuming that the reference signal is transmitted based on the second transmission scheme in the overlapping resource region.

According to another aspect of the present disclosure, there is provided a user equipment for receiving control information, the user equipment comprising: a receiver configured for receiving a reference signal via at least one of a first transmission scheme in which a single antenna port is used for the reference signal and a second transmission scheme in which multiple antenna ports are used for the reference signal, wherein a resource region for the first transmission scheme overlaps at least partially with a resource region for the second transmission scheme, wherein when the processor performs the blind detection based on the first transmission scheme, the processor performs the blind detection by assuming that the reference signal is transmitted based on the second transmission scheme in the overlapping resource region.

According to still another aspect of the present disclosure, there is provided a method for transmitting control information by a base station in a wireless communication system, the method comprising: transmitting a reference signal via at least one of multiple antenna ports; and transmitting control information of an user equipment based on at least one of a first transmission scheme in which a single antenna port is used for the reference signal and a second transmission scheme in which multiple antenna ports are used for the reference signal, wherein a resource region for the first transmission scheme overlaps at least partially with a resource region for the second transmission scheme, wherein the base station rate-matches the control information of the user equipment, considering that the reference signal is transmitted based on the second transmission scheme in the overlapping resource region.

According to still another aspect of the present disclosure, there is provided a base station configured to perform the method for transmitting the control information as defined above.

Preferably, reference signal resources of the multiple antenna ports for the second transmission scheme may be frequency division multiplexed.

When the user equipment performs the blind detection based on the first transmission scheme, the user equipment may assume that the control information of the user equipment has been rate-matched with respect to all of the reference signal resources in the overlapping resource region.

The user equipment may determine that one of the multiple antenna ports specified using an identifier of the user equipment is the single antenna port for the first transmission scheme.

The user equipment may perform N times of blind detection attempts based on the first transmission scheme for a first port among the multiple antenna ports. The user equipment may perform M times of blind detection attempts based on the first transmission scheme for a second port among the multiple antenna ports, wherein a ratio between N and M may be signaled from the base station.

The reference signal and the control information may be received on a self-contained subframe having all of a downlink control symbol, a data symbol, and an uplink control symbol.

Channel estimation for the single antenna port acquired from the reference signal may be reused for performing blind detection based on the second transmission scheme by the user equipment.

The user equipment may perform the blind detection based on both the first transmission scheme and the second transmission scheme. Alternatively, the user equipment may perform the blind detection based on one of the first transmission scheme and the second transmission scheme indicated by the base station.

The first transmission scheme may be a single port beamforming scheme, and the second transmission scheme may be a transmission diversity scheme.

Advantageous Effects

According to the present disclosure, the reference signal used for demodulation of downlink control information may be configured based on various transmission schemes. This may improve the scheduling flexibility of downlink control information and the efficiency of resource usage.

It will be appreciated by persons skilled in the art that that the effects that could be achieved with the present disclosure are not limited to what has been particularly described hereinabove and other advantages of the present disclosure will be more clearly understood from the following detailed description.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

MODE FOR INVENTION

The following description of embodiments of the present disclosure may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP based mobile communication system, by which the technical idea of the present disclosure may be non-limited. Specific terminologies used in the following description are provided to help understand the present disclosure and the use of the terminologies can be modified to a different form within a scope of the technical idea of the present disclosure.

Prior to discussion of the New RAT, the 3GPP LTE/LTE-A system will briefly be described. The following description of 3GPP LTE/LTE-A may be referenced to help understanding of New RAT, and some LTE/LTE-A operations and configurations that do not conflict with the design of New RAT may also be applied to New RAT. New RAT may be referred to as 5G mobile communication for convenience.

3GPP LTE/LTE-A system

Figure 1:
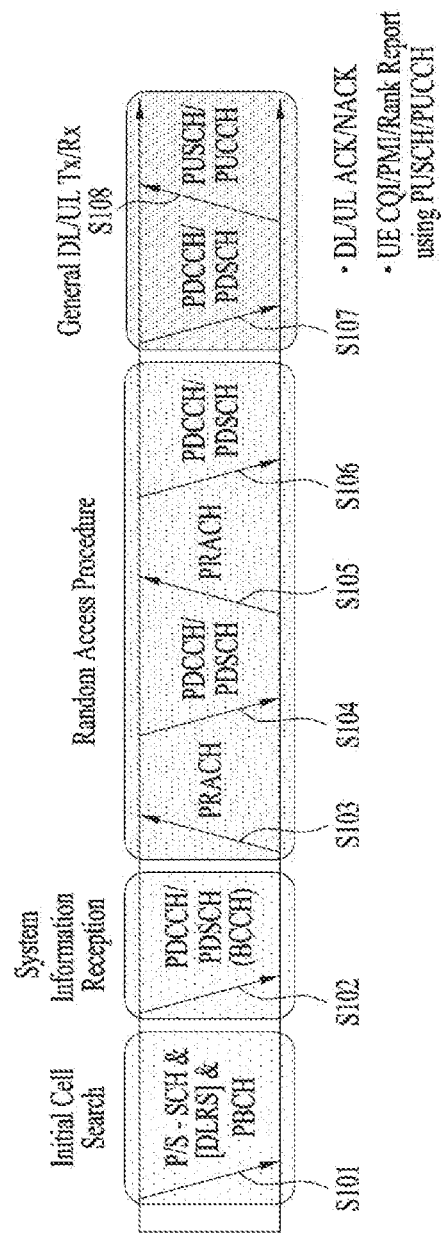
FIG. 1 is a diagram for explaining an example of physical channels used for a 3GPP LTE/LTE-A system and a general signal transmission method using the same.

FIG. 1 is a diagram for explaining an example of physical channels used for 3GPP LTE/LTE-A system and a general signal transmission method using the same.

Referring to FIG. 1, if a power of a user equipment is turned on or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the eNB, may match synchronization with the eNB and may then obtain information such as a cell ID and the like. Subsequently, the user equipment may receive a physical broadcast channel (PBCH) from the eNB and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain detailed system information [S102].

Meanwhile, the user equipment may be able to perform a random access procedure to complete the access to the eNB

[S103 to S106]. To this end, the user equipment may transmit a preamble via a physical random access channel (PRACH) [S103] and may be then able to receive a response message via PDCCH and a corresponding PDSCH in response to the preamble [S104]. In case of a contention based random access, it may be able to perform a contention resolution procedure such as a transmission [S105] of an additional physical random access channel and a channel reception [S106] of a physical downlink control channel and a corresponding physical downlink shared channel.

Having performed the above mentioned procedures, the user equipment may be able to perform a PDCCH/PDSCH reception [S107] and a PUSCH/PUCCH (physical uplink shared channel/physical uplink control channel) transmission [S108] as a general uplink/downlink signal transmission procedure. Control information transmitted to an eNB by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) and the like. In the present specification, the HARQ-ACK/NACK is simply called HARQ-ACK or ACK (NACK) (A/N). The HARQ-ACK includes at least one of a positive ACK (simply, ACK), a negative ACK (NACK), DTX, and NACK/DTX. The UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 2:
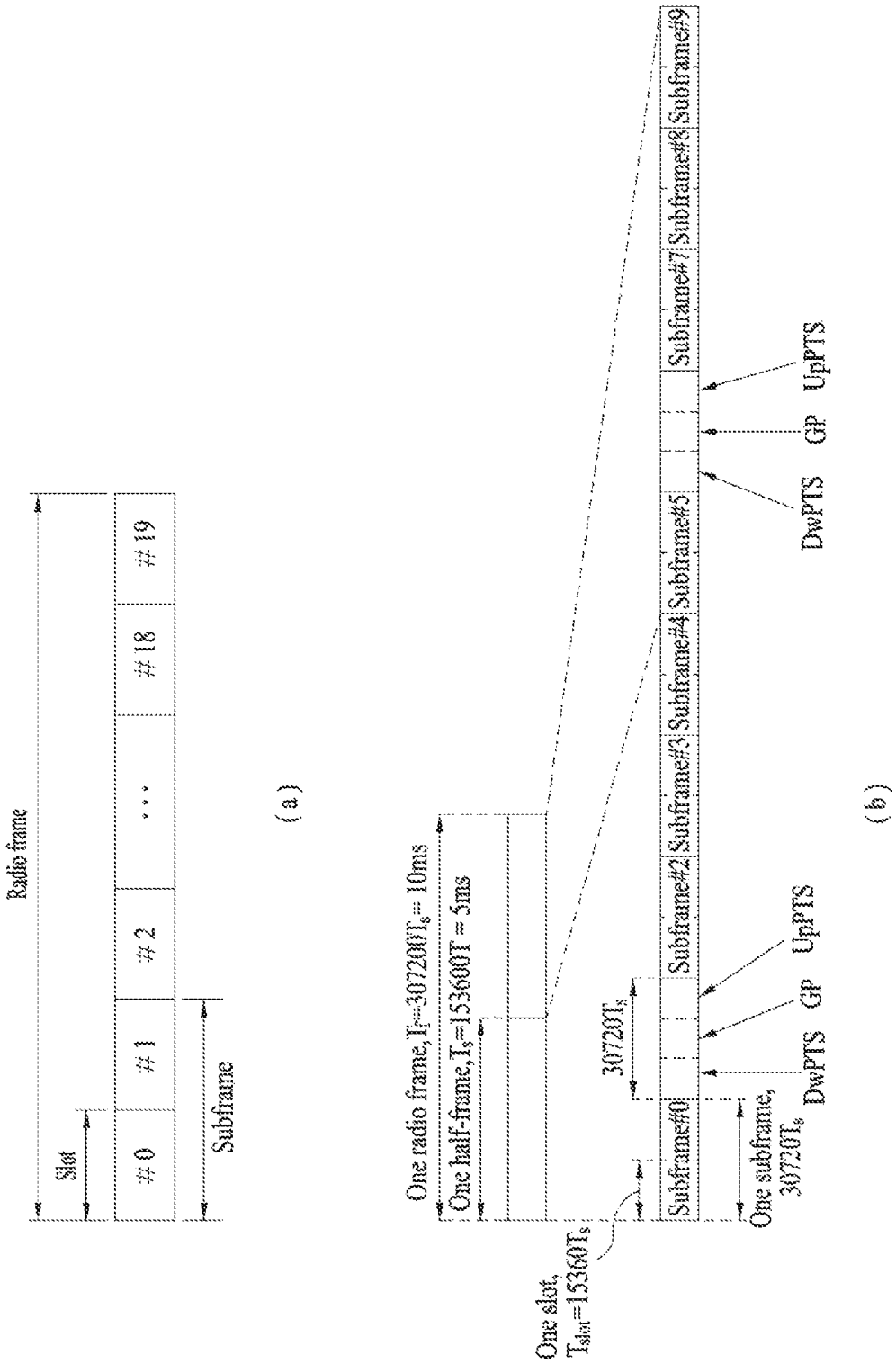
FIG. 2 is a diagram for explaining an example of a structure of a radio frame for a 3GPP LTE/LTE-A system.

FIG. 2 is a diagram for explaining an example of a structure of a radio frame. Referring to FIG. 2, UL/DL (uplink/downlink) data packet transmission is performed by a unit of subframe in a cellular OFDM radio packet communication system. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 2(a) is a diagram for a structure of a type 1 radio frame. A DL (downlink) radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDM in downlink, OFDM symbol is provided to indicate one symbol period. The OFDM symbol may be named SC-FDMA symbol or symbol period. Resource block (RB) may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first maximum 3 OFDM symbols of each subframe may be allocated to PDCCH (physical downlink control channel), while the rest of the OFDM symbols are allocated to PDSCH (physical downlink shared channel).

FIG. 2(b) is a diagram for an example of a structure of a type 2 radio frame. The type-2 radio frame includes 2 half frames. Each of the half frames includes 5 subframes, DwPTS (downlink pilot time slot), GP (guard period) and UpPTS (uplink pilot time slot) and one subframe consists of two slots. The DwPTS is used for initial cell search, synchronization or channel estimation in a user equipment. The UpPTS is used for channel estimation in an eNB and uplink transmission synchronization of a user equipment. The guard period is a period for eliminating interference generated in uplink due to multi-path delay of a downlink signal between uplink and downlink.

The above-described structures of the radio frame are exemplary only. And, the number of subframes included in a radio frame, the number of slots included in the subframe and the number of symbols included in the slot may be modified in various ways.

Figure 3:
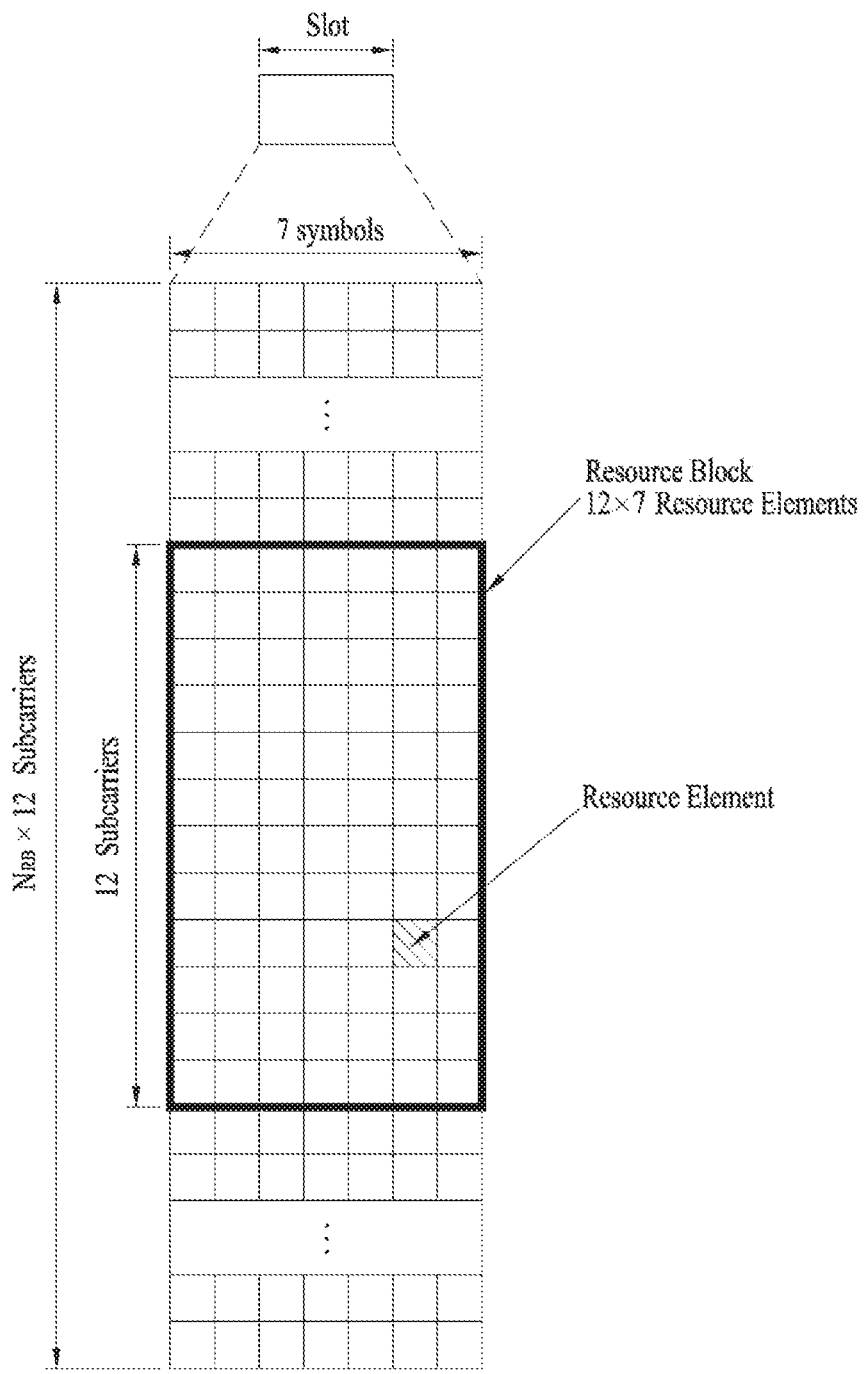
FIG. 3 is a diagram for one example of a resource grid for a downlink slot for a 3GPP LTE/LTE-A system.

FIG. 3 is a diagram for one example of a resource grid for a downlink slot.

Referring to FIG. 3, one downlink (DL) slot may include a plurality of OFDM symbols in time domain. In particular, one DL slot exemplarily includes 7(6) OFDM symbols and one resource block (RB) includes 12 subcarriers in frequency domain. Each element on a resource grid is called a resource element (hereinafter abbreviated RE). One resource block includes 12 7(6) resource elements. The number NRB of resource blocks included in a DL slot may depend on a DL transmission bandwidth. And, the structure of an uplink (UL) slot may be identical to that of the DL slot and OFDM symbol is replaced by SC-FDMA symbol.

Figure 4:
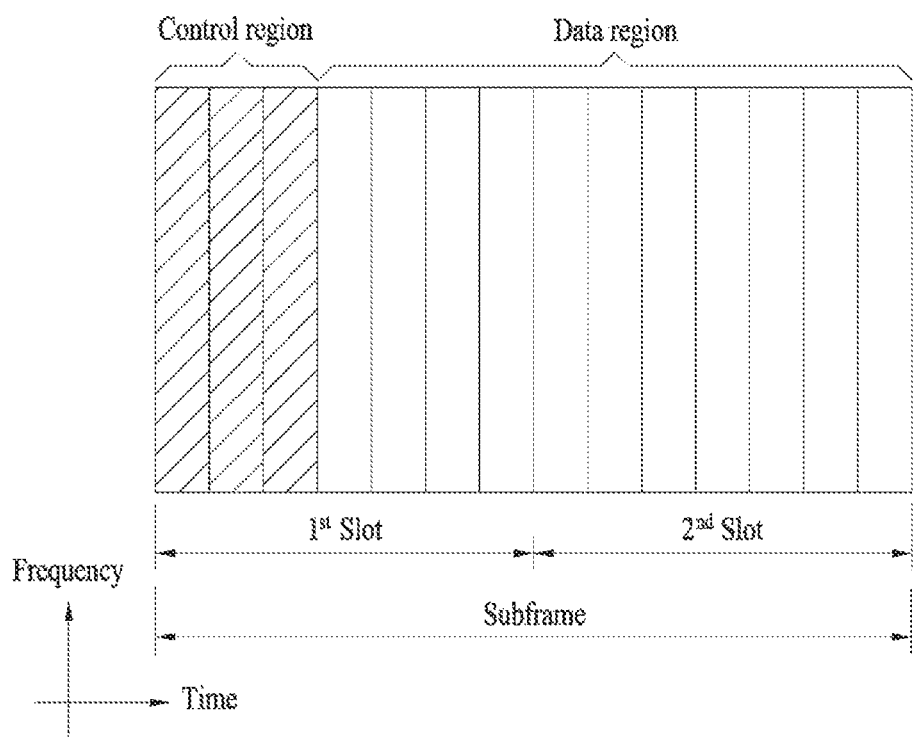
FIG. 4 is a diagram for a structure of a downlink subframe for a 3GPP LTE/LTE-A system.

FIG. 4 is a diagram for an example of a structure of a downlink subframe.

Referring to FIG. 4, maximum 3 (4) OFDM symbols situated at a fore part of a first slot of one subframe correspond to a control region to which control channels are allocated. The rest of OFDM symbols correspond to a data region to which PDSCH (physical downlink shared channel) is allocated. PDSCH is used for carrying a transport block (hereinafter abbreviated TB) or a codeword (hereinafter abbreviated CW) corresponding to the TB. The TB means a data block delivered from a MAC (medium access control) layer to a PHY (physical) layer on a transport channel. The CW corresponds to a coded version of the TB. Correlation between the TB and the CW may vary depending on a swapping. In the present specification, PDSCH, a TB, and a CW are used in a manner of being mixed. Examples of DL control channels used by LTE (-A) may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and carries information on the number of OFDM symbols used for a transmission of a control channel within the subframe. The PHICH carries a HARQ-ACK (hybrid automatic repeat and request acknowledgement) signal in response to an UL transmission. The HARQ-ACK response includes a positive ACK (simply, ACK), a negative ACK (NACK), DTX (discontinuous transmission), or NACK/

DTX. In this case, HARQ-ACK, HARQ ACK/NACK, and ACK/NACK are used in a manner of being mixed.

Control information carried on PDCCH may be called downlink control information (hereinafter abbreviated DCI). The DCI includes resource allocation information for a UE or a UE group and different control information. For instance, the DCI includes UL/DL scheduling information, UL transmit (Tx) power control command, and the like.

Control channel elements (CCEs), which are contiguous logical allocation units, are used in mapping a PDCCH to REs. A CCE includes a plurality of resource element groups (e.g., 9 REGs). Each REG includes four REs which may neighbor each other if the RS is excluded.

The number of CCEs necessary for a specific PDCCH depends on a DCI payload corresponding to the size of control information, a cell bandwidth, a channel coding rate, etc. Specifically, the number of CCEs for a specific PDCCH may be defined according to PDCCH formats as shown in Table 1.

TABLE 1

| PDCCH format | Number of CCEs | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

As described above, one of the four formats may be used for a PDCCH, it is not known to the UE. Accordingly, the UE needs to perform decoding without knowing the PDCCH format. This is called blind decoding. Since decoding as many CCEs used for downlink as possible for each PDCCH format causes significant load to the UE, a search space is defined in consideration of restriction on the scheduler and the number of attempts to perform decoding.

That is, the search space is a set of candidate PDCCHs composed of CCEs which the UE needs to attempt to decode at an aggregation level. Each aggregation level and the corresponding number of candidate PDCCHs may be defined as shown in Table 2.

TABLE 2

| | Search space | | |
|---|---|---|---|
| | Aggregation level | Size (in CCE units) | Number of PDCCH candidates |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

As shown in Table 2, there are 4 aggregation levels, and the UE has a plurality of search spaces according to the aggregation levels. The search spaces may be divided into a UE-specific search space (USS) and a common search space (CSS), as shown in Table 2. The UE-specific search space is for specific UEs. Each UE may check an RNTI and CRC with which the PDCCH is masked, by monitoring the UE-specific search space thereof (attempting to decode a PDCCH candidate set according to a possible DCI format) and acquire control information if the RNTI and CRC are valid.

The CSS is intended for use in the case in which a plurality of UEs or all UEs need to receive PDCCHs, as in the cases of system information dynamic scheduling and paging messages. The CSS may be used for a specific UE in terms of resource management. Furthermore, the CSS may overlap the USS.

Specifically, the search space may be determined by Equation 1 given below.

$$L \{(Y_k + m') \bmod \lfloor N_{CCE,k}/L \rfloor\} + i \qquad \text{Equation 1}$$

Here, L denotes an aggregation level, is a variable determined by an RNTI and subframe number k, and m' is the number of PDCCH candidates. If carrier aggregation is applied, otherwise. Herein, is the number of PDCCH candidates. is the total number of CCEs in the control region of a k-th subframe, and i is a factor indicating an individual CCE in each PDCCH candidate and is set as i=0, 1, ..., L−1. For the CSS, is always determined to be 0.

Figure 5:
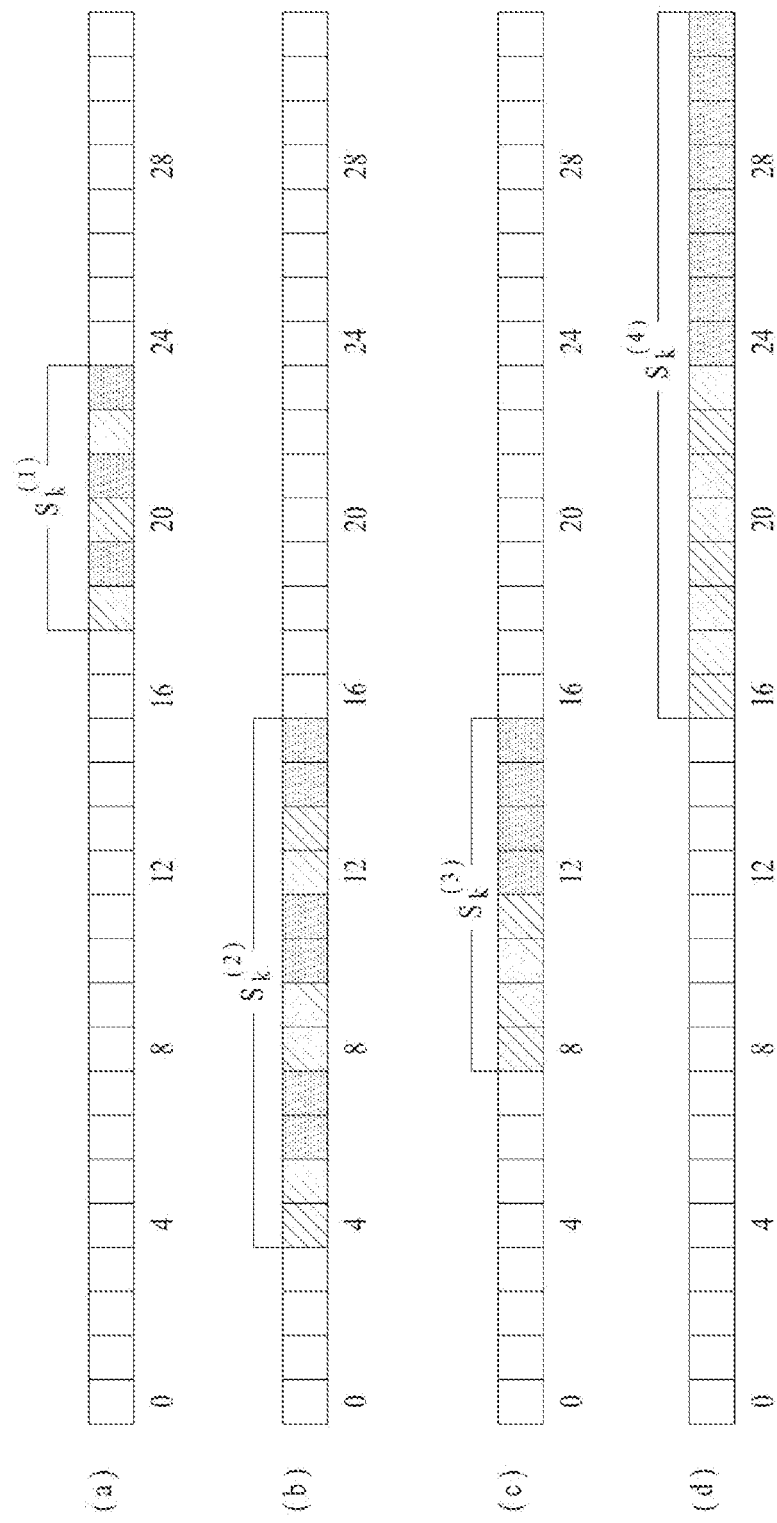
FIG. 5 illustrates a search space of a 3GPP LTE/LTE-A system.

FIG. 5 shows USSs (shaded portions) at respective aggregation levels which may be defined according to Equation 1. Carrier aggregation is not used, and is set to 32 for simplicity of illustration.

FIGS. 5(a), 5(b), 5(c) and 5(d) illustrate the cases of aggregation levels 1, 2, 4 and 8, respectively. The numbers represent CCE numbers. In FIG. 5, the start CCE of a search space at each aggregation level is determined based on an RNTI and subframe number k. This CCE may be differently determined for a UE at the respective aggregation levels in the same subframe according to the modulo function and L. The start CCE is always determined to correspond to a multiple of the corresponding aggregation level due to L. In the description given below, is exemplarily assumed to be CCE number 18. The UE attempts to sequentially decode the CCEs starting with the start CCE in units of CCEs determined for a corresponding aggregation level. In FIG. 5(b), for example, The UE attempts to decode the CCEs two by two, starting with CCE 4, which is the start CCE, according to the aggregation level.

In this manner, the UE attempts to perform decoding in a search space. The number of decoding attempts is determined by a DCI format and a transmission mode determined through radio resource control (RRC) signaling. If carrier aggregation is not applied, the UE needs to attempt to perform decoding up to 12 times in the CSS, in consideration of two DCI sizes (DCI formats 0/1A/3/3A and DCI format 1C) for each of six PDCCH candidates. In the USS, the UE needs to attempt to perform decoding up to 32 times, in consideration of two DCI sizes for each of 16 (6+6+2+2=16) PDCCH candidates. Accordingly, when carrier aggregation is not applied, the UE needs to attempt to perform decoding up to 44 times.

On the other hand, if carrier aggregation is applied, the maximum number of decodings increases because as many decodings for a USS and DCI format 4 as the number of DL resources (DL component carriers) are added.

Figure 6:
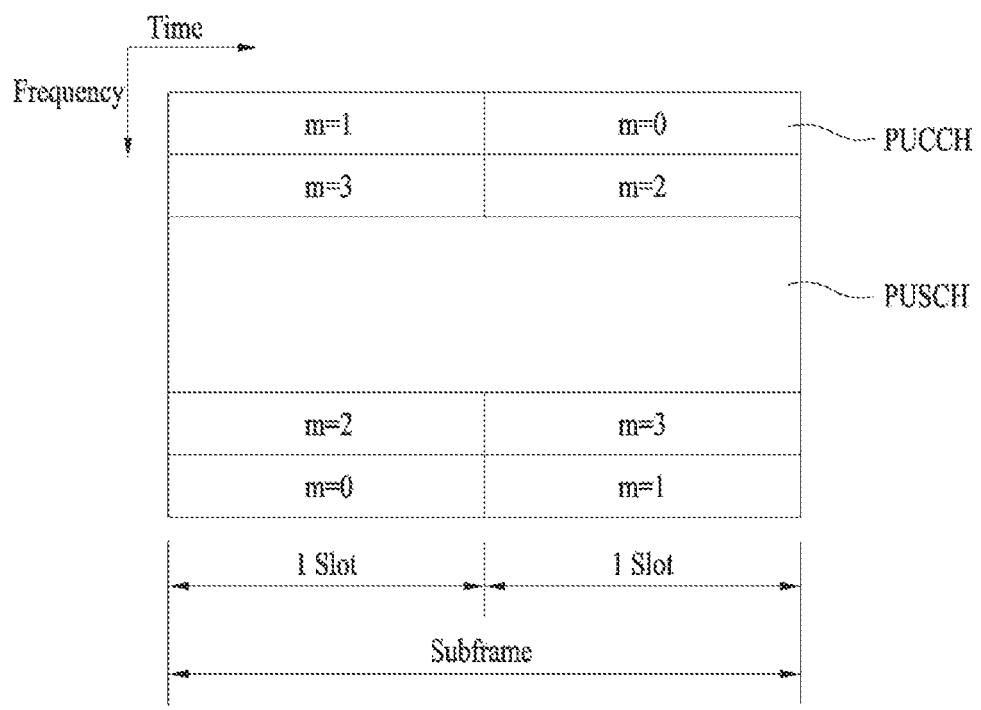
FIG. 6 illustrates an architecture of an uplink subframe of a 3GPP LTE/LTE-A system.

FIG. 6 is a diagram for an example of a structure of an uplink subframe.

Referring to FIG. 6, an uplink subframe includes a plurality of slots (e.g., 2 slots). A slot may include a different number of SC-FDMA symbols according to a length of CP. A UL subframe may be divided into a control region and a data region in frequency domain. The data region includes PUSCH and can be used for transmitting a data signal such as an audio and the like. The control region includes PUCCH and can be used for transmitting UL control information (UCI). The PUCCH includes a RB pair situated at the both ends of the data region on a frequency axis and hops on a slot boundary.

The PUCCH can be used for transmitting control information such as SR(Scheduling Request), HARQ-ACK and/or CSI (Channel State Information)s.

In transmitting packets in a wireless communication system, the packets are transmitted over a radio channel, and therefore signal distortion may occur in the transmission process. For a receiver to receive the correct signal in spite of signal distortion, the received distorted signal should be corrected using channel information. In detecting the channel information, a signal which is known to both the transmitter and the receiver is transmitted and the extent of distortion of the signal received over the channel is mainly used to detect the channel information. This signal is referred to as a pilot signal or a reference signal.

In the case in which data is transmitted and received using multiple antennas, a channel state between a transmit antenna and a receive antenna needs to be recognized to receive a correct signal. Accordingly, a separate RS is needed for each transmit antenna, more specifically, for each antenna port.

RSs may be divided into a UL RS and a DL RS. In the current LTE system, the UL RSs include: i) a demodulation-reference signal (DM-RS) for channel estimation for coherent demodulation of information transmitted over a PUSCH and a PUCCH, and ii) a sounding reference signal (SRS) allowing the BS to measure UL channel quality at frequencies for different networks.

The DL RSs include: i) a cell-specific reference signal (CRS) shared by all UEs in a cell; ii) a UE-specific reference signal for a specific UE; iii) a demodulation-reference signal (DM-RS) transmitted for coherent demodulation in the case of transmission of a PDSCH; iv) a channel state information-reference signal (CSI-RS) for delivering channel state information (CSI) in the case of transmission of a DL DMRS; v) a multimedia broadcast single frequency network (MBSFN) reference signal transmitted for coherent demodulation of a signal transmitted in an MBSFN mode, and vi) a positioning reference signal used to estimate geographic position information of a UE.

The RSs may be broadly divided into two reference signals according to the purposes thereof. There are an RS used to acquire channel information and an RS used for data demodulation. Since the former is used when the UE acquires channel information on DL, this RS should be transmitted over a wide band and even a UE which does not receive DL data in a specific subframe should receive the RS. This RS is also applied to situations such as handover. The latter RS is sent by the BS along with a resource on DL. The UE may receive the RS to perform channel measurement to implement data modulation. This RS should be transmitted in a region in which data is transmitted.

The CRS is used for two purposes of acquisition of channel information and data demodulation, and the UE-specific RS is used only for data demodulation. The CRS is transmitted in every subframe in a wide band and RSs for up to four antenna ports are transmitted according to the number of transmit antennas of the BS.

For example, if the number of transmit antennas of the BS is 2, CRSs for antenna ports #0 and #1 are transmitted. If the number of transmit antennas of the BS is 4, CRSs for antenna ports #0 to #3 are respectively transmitted.

Figure 7:
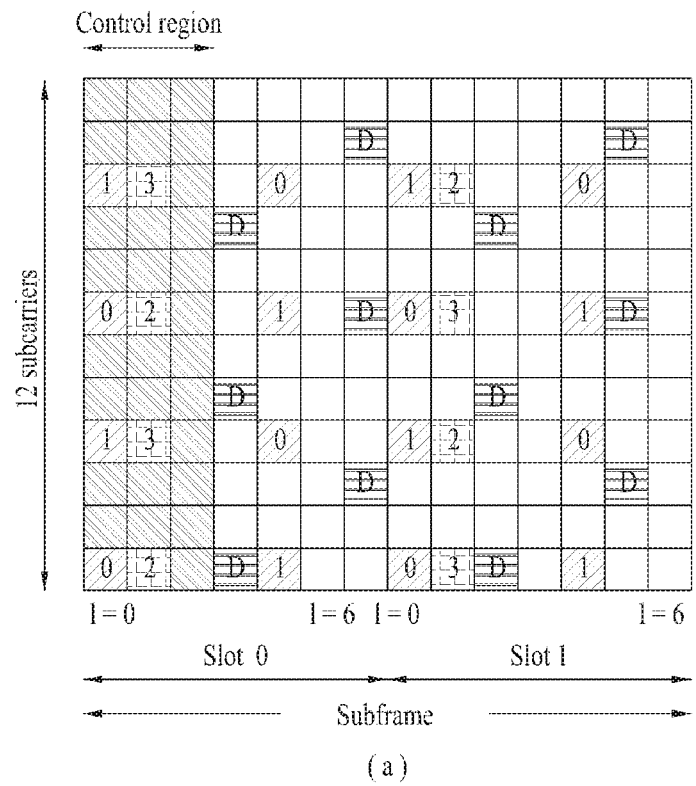
FIG. 7 illustrates a reference signal of a 3GPP LTE/LTE-A system.
Figure 7:
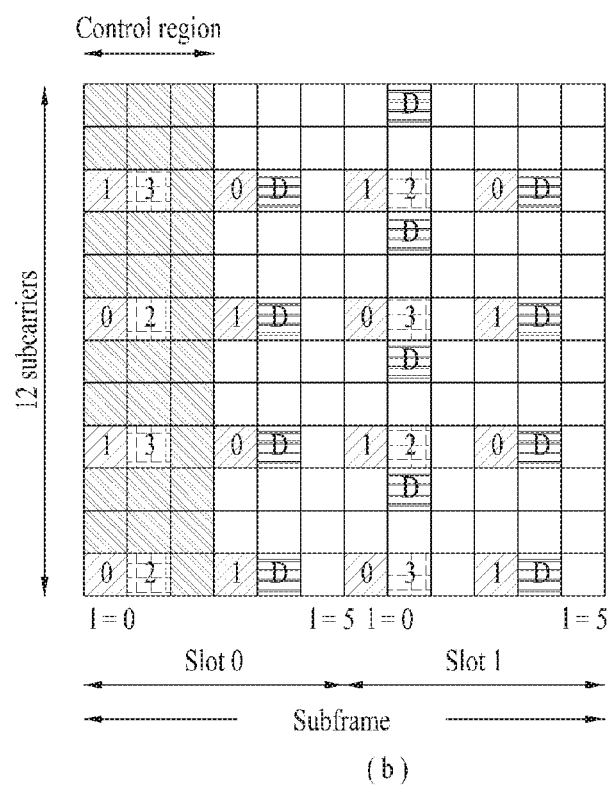

FIG. 7 is a diagram illustrating a pattern in which CRSs and DRSs defined in legacy 3GPP LTE (e.g., Release-8) are mapped to resource block (RB) pairs. A downlink RB pair, a unit in which an RS is mapped, may be represented as a unit of one subframe in the time domain times 12 subcarriers in the frequency domain. That is, one RB pair has a length of 14 OFDM symbols for a normal CP (FIG. 7(a)) and a length of 12 OFDM symbols for an extended CP (FIG. 7(b)).

FIG. 7 shows locations of RSs on RB pairs in a system with a BS supporting four transmit antennas. In FIG. 7, resource elements (REs) marked "0", "1", "2" and "3" represent the locations of the CRSs for antenna port indexes 0, 1, 2 and 3, respectively. In FIG. 7, REs denoted by "D" represent locations of the DMRSs.

New RAT

According to performance requirements for the New RAT, a subframe needs to be newly designed to satisfy low latency. The 3GPP LTE system has been designed in a frame structure having TTI of 1 ms, and a data request latency time for a video application is 10 ms. However, future 5G technology requires data transmission of lower latency due to the introduction of a new application such as real-time control and tactile internet, and aims to provide data latency reduced by 10 times as compared with the related art.

The New RAT system uses an OFDM transmission scheme or a similar transmission scheme and may have OFDM numerology as shown in Table 3, for example.

TABLE 3

| Parameter | Value |
| --- | --- |
| Subcarrier-spacing ($\Delta f$) | 75 kHz |
| OFDM symbol length | 13.33 us |
| Cyclic Prefix (CP) length | 1.04 us/0/94 us |
| System BW | 100 MHz |
| No. of available subcarriers | 1200 |
| Subframe length | 0.2 ms |
| Number of OFDM symbol per Subframe | 14 symbols |

Self-Contained Subframe

Figure 8:
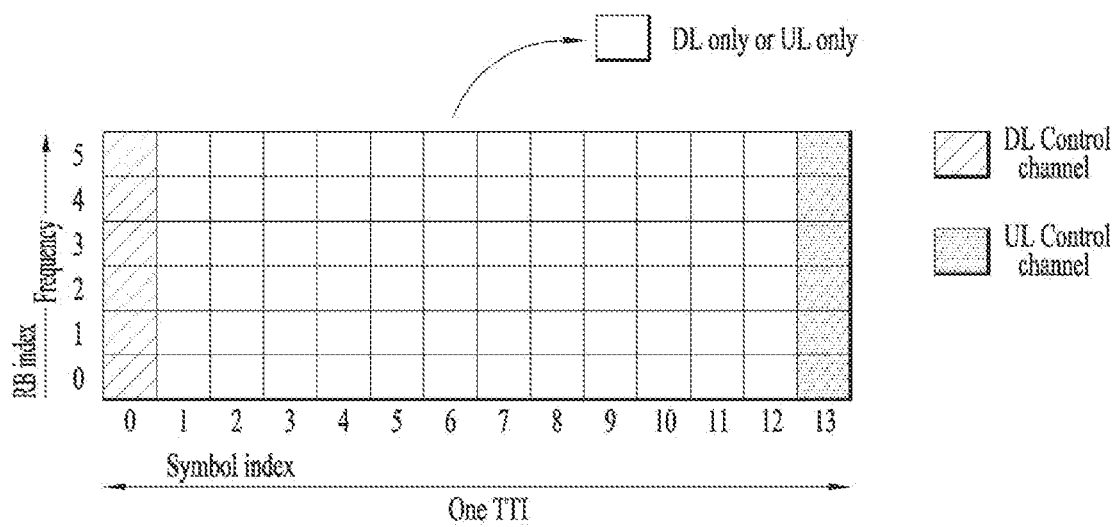
FIG. 8 illustrates an architecture of a self-contained subframe according to one embodiment of the present disclosure.

FIG. 8 is a diagram illustrating a structure of a self-contained subframe according to one embodiment of the present disclosure.

According to a TDD-based self-contained subframe structure, both a resource region for DL and a resource region for UL (e.g., DL and UL control channels) exist in one subframe.

In FIG. 8, oblique line areas indicate downlink control regions and black colored areas indicate uplink control regions. Areas having no mark may be used for downlink data transmission or uplink data transmission.

In this self-contained subframe rstructure, downlink (DL) transmission and uplink (UL) transmission are performed in due order within one subframe, whereby DL data may be transmitted and UL ACK/NACK may be received within one subframe. Similarly, UL data may be transmitted and DL ACK/NACK may be received within one subframe. As a result, the time required for data re-transmission may be reduced when an error occurs in data transmission, whereby latency of final data transfer may be minimized.

As described above, the expression "Self-Contained" may cover that a response (ACK/NACK) to DL or UL transmitted within the corresponding subframe is received within the corresponding subframe. However, since the time of one subframe or more may be required for transmission and response in accordance with processing performance of the UE/eNB, the self-contained subframe will be defined as a subframe that may self-contain DL control information, DL/UL data and UL control information. That is, UL control information of Self-contained Subframe is not limited to HARQ-ACK information on DL data transmitted at the corresponding subframe.

This self-contained subframe structure requires a time gap that allows an eNB and a UE to switch a transmission mode to a reception mode and vice versa. To this end, at least one OFDM symbol on which DL to UL switching is performed is set as a guard period (GP) in the self-contained subframe structure.

Although the self-contained subframe structure shown in FIG. 8 shows that a subframe is configured in the order of DL control region-data region-UL control region, the present disclosure is not limited thereto. For example, as another self-contained subframe structure, a subframe may be configured in the order of DL control region-UL control region-data region.

Also, for convenience of description, one subframe includes a total of 14 OFDM symbols, and one OFDM symbol is allocated to each of the DL control region and the UL control region. However, one or more OFDM symbols may be allocated to each of the DL control region and the UL control region. Similarly, the number of OFDM symbols included in one subframe may be changed.

Analog Beamforming

Since a wavelength becomes short in the field of Millimeter Wave (mmW), a plurality of antenna elements may be installed in the same area. That is, a wavelength is 1 cm in a band of 30 GHz, and a total of 100 antenna elements of a 2D array may be arranged in a panel of 5 by 5 cm at an interval of 0.5λ(wavelength). Therefore, as a plurality of antenna elements are used, beamforming gain is enhanced, and coverage increase and/or throughput improvement is expected.

In the mmW scheme, if a transceiver unit (TXRU) is provided per antenna element, it is possible to control a transmission power and phase per antenna element, whereby independent beamforming may be performed for each frequency resource. However, a problem occurs in that effectiveness is deteriorated in view of cost when TXRU is independently provided for all of 100 antenna elements.

Therefore, a scheme for mapping a plurality of antenna elements into one TXRU and controlling a beam direction by an analog phase shifter may be considered. However, since this analog beamforming scheme forms beams in only one beam direction with respect to a full band, a problem occurs in that frequency selective beamforming is not available.

As a hybrid type of digital beamforming and analog beamforming, a hybrid beamforming scheme for mapping a total of B TXRUs into a total of Q antenna elements (where, B<Q) may be considered. In this case, although there is a difference depending on a mutual connection scheme of B TXRUs and Q antenna elements, the number of beam directions that enable simultaneous transmission is limited to B or less.

The Self-contained subframe may be categorized into DL Self-contained subframe (hereinafter, DL subframe) and UL Self-contained subframe (hereinafter, UL subframe) in accordance with a direction of data transmitted at the corresponding subframe.

Figure 9:
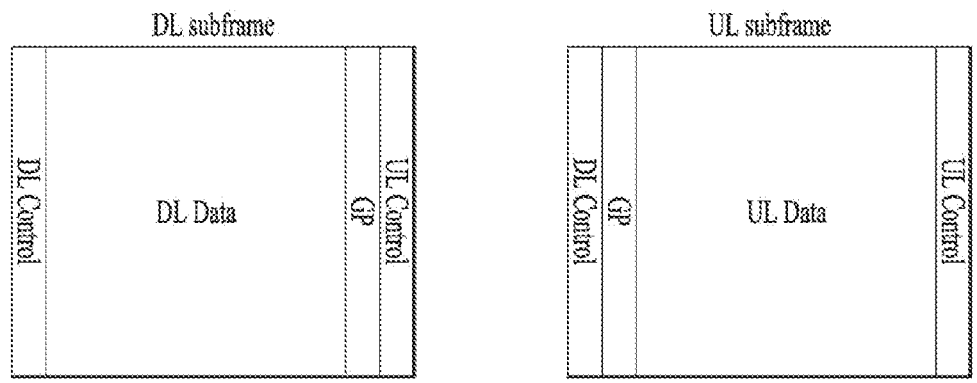
FIG. 9 illustrates a downlink self-contained subframe and an uplink self-contained subframe according to one embodiment of the present disclosure.

FIG. 9 is a diagram illustrating a DL subframe and a UL subframe according to one embodiment of the present disclosure.

Referring to FIG. 9, the GP is located at the time when DL is switched to UL. For example, the GP is located between the DL data region and the UL control region at the DL subframe, and is located between the DL control region and the UL data region at the UL subframe.

The GP may include Tx/Rx switching time of the eNB/UE and a timing advance (TA) for UL transmission of the UE.

Reference Signal Configuration on Control Region for New RAT

The following describes a reference signal configuration (RS configuration) for a control channel for the New RAT (NR) according to embodiments of the present disclosure.

First, referring to a legacy LTE, an User Equipment (UE) may demodulate a Physical Downlink Control Channel (PDCCH) using 1-, 2-, or 4-port CRS. To this end, the UE assumes a number of antenna ports and a transmission scheme for CRS/PDCCH based on a Physical Broadcast Channel (PBCH) decoding result. That is, the UE assumes that a number of antennas for the PBCH derived using blind detection (BD) in the PBCH reception process is equally applied to that for the PDCCH. For example, the UE assumes that a number of transmission antennas for the PBCH is equal to a number of transmission antennas for the PDCCH. When the number of antenna ports for the PBCH (or PDCCH) is 2 or larger, the UE assumes that a transmission diversity scheme is applied to the PDCCH.

As described above, in the legacy LTE system, when the number of the antenna ports for the PBCH is not changed, the number of antenna ports for the CRS and PDCCH transmission scheme may also be regarded as unchanged.

In the New RAT, it is desirable to relax such restriction to increase flexibility of transmission of the control information. An approach for improving the flexibility of the control information transmission may involve a dynamic change of transmission scheme and antenna port for the control information.

In this connection, multi-user multiple-input and multiple output (MU-MIMO) for the PDCCH is not allowed in the legacy LTE. MU-MIMO is available in a limited sense, for EPDCCH of LTE-A, but scheduling restriction to MU-MIMO for EPDCCH is present. For example, the MU-MIMO for the EPDCCH may be available only between UEs that satisfy a predetermined condition related to UE ID (e.g., C-RNTI) and aggregation level.

However, in the New RAT, it is necessary to improve efficiency of resource use for transmission and reception of the control information by mitigating the scheduling restriction and allowing the MU-MIMO transmission of the control channel. To this end, the present disclosure proposes a RS configuration in the New RAT control channel. Further, when a plurality of RS ports are defined, a multiplexing approach between the defined RS ports is proposed as well.

In following examples, for convenience of illustration, a number of RS ports included in one PRB will be described, assuming that 12 subcarriers constitute one PRB. However, the present disclosure is not limited to the above assumption. For example, the PRB configuration, and/or a number of resource elements (RE) to which RS is mapped may vary. Further, in the following, one port-based transmission may refer to a transmission scheme employing beamforming. Further, spatial frequency block coding (SFBC) may be interpreted as representing a transmission scheme employing transmission diversity. However, the scope of the present disclosure is not limited to the beamforming and SFBC. The beamforming and the SFBC may be considered as a transmission scheme using one port and a transmission scheme using a plurality of ports, respectively. Further, the sequence generation of the RS, which will be described later, may be defined in a cell-specific manner.

According to one-port transmission beamforming, the same data (e.g., one layer) may be mapped to one digital/logical port. Then, one layer on one digital/logical port may be mapped to N physical antennas by applying a beamforming weighting matrix having 1*N size to said one digital/logical port. Then, one layer may be transmitted using a beam formed by the N physical antennas, resulting in beamforming gain. A precoding matrix of a predefined codebook may be reused as the beamforming weighting matrix.

Example 1

FDM-Based RS Port Multiplexing

According to one embodiment of the present disclosure, RS ports may be frequency division multiplexed (FDMed).

When the network can arbitrarily determine a transmission scheme (e.g., single port (or 1-port)-based transmission or SFBC) for transmitting the control information (e.g., NR-PDCCH), the UE may perform blind detection (BD) for multiple transmission schemes, respectively, or alternatively, a transmission scheme to be subjected to the BD may be pre-configured for each UE.

When the UE needs to perform the BD on all of the multiple transmission schemes, the complexity related to UE implementation and processing may increase in proportion to the number of channel estimates. Further, when the numbers of RS ports required are different between transmission schemes, it is desirable to reduce overhead due to an unnecessary RS port in a transmission scheme requiring a small number of RS ports, thereby securing a coding gain.

For example, it is assumed that for the SFBC control information transmission scheme, the RS needs to be transmitted on N REs using each of port #0 and port #1 (that is, on total 2N REs per PRB). It is assumed that for the single port (1-port)-based control information transmission scheme, the RS needs to be transmitted on a total of N REs (per PRB) only using port #0. When the base station transmits the control information using the single port (1-port)-based transmission scheme, the base station may determine that the RS need not be transmitted using the port #1. Therefore, the base station may map the control information instead of the RS to the N REs used for the RS using the port #1. As a result, since the number of REs available for the control information has increased by N, the network may further increase the coding gain for the control information.

In this example, the UE may assume a different number of the ports based on transmission schemes in order to reduce the complexity of the UE and improve the coding gain. In this connection, different ports may be multiplexed based on a frequency divisional multiplexing (FDM) scheme. Some of the multiple ports may be used in common between different transmission schemes. For a transmission scheme requiring a large number of ports, additional ports may be defined in addition to the common port.

Figure 10:
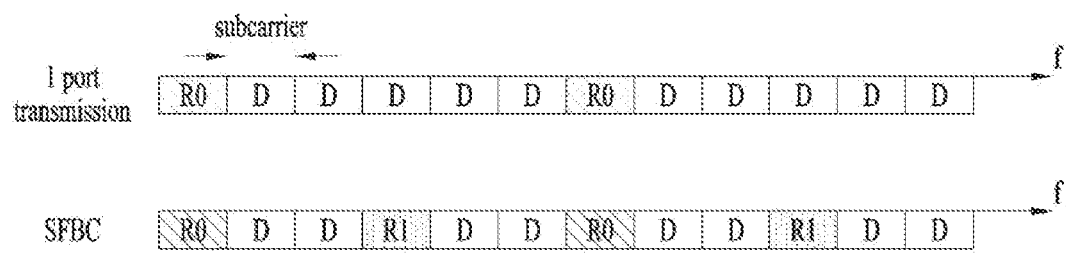
FIG. 10 to FIG. 12 each illustrate a FDM-based RS configuration according to one embodiment of the present disclosure.

FIG. 10 illustrates an RS port configuration based on a transmission scheme according to one embodiment of the present disclosure.

In FIG. 10, it is assumed that the control channel (e.g., NR-PDCCH) is transmitted using a single control symbol in a time domain. However, the same approach may be used when the control channel is transmitted using multiple control symbols. Further, although FIG. 10 shows a transmission scheme using one or two ports, this approach may also be applied to transmission schemes that use more than two ports.

Referring to FIG. 10, when the UE performs the BD for the single port (1-port)-based transmission, the UE considers only port 0 (R0). Alternatively, when the UE performs the BD for the SFBC, the UE considers both port 0 and port 1 (R0 and R1). In FIG. 10, D refers to RE to which the control information is mapped.

When the RS port multiplexing scheme is used, as shown in FIG. 10, the UE may perform a BD corresponding to each of a plurality of transmission schemes in the same resource region. In this connection, the UE may share a channel estimation result using R0 during performing the transmission scheme-based BD. For example, the channel estimation result using R0 may be used not only for performing BD for the single port (1-port)-based transmission but also for performing BD for the SFBC. Therefore, when the UE performs the BD for the SFBC, only channel estimation using R1 needs to be further performed. The channel estimation and the complexity of the BD may be reduced. Further, when the UE performs the BD for the single port (1-port)-based transmission, the UE may assume that REs other than the RE (e.g., R0) on which the RS is transmitted are used for the control information transmission.

In one embodiment, FIG. 10 may be understood as an example in which UE-specific search space (USS) and common search space (CSS) are distinguished from each other. In one example, the RS configuration based on the single port (1-port)-based transmission shown in FIG. 10 is defined for the USS, while the SFBC-based RS configuration shown in FIG. 10 may be defined for the CSS. When whether the search space is CSS or USS is associated with the number of ports, the type of the SS and the associated number of the ports may be indicated together via single signaling.

Alternatively, the USS and CSS may be identified by a UE-specific RNTI/common-RNTI, while SS-specific transmission schemes may not be defined. In this connection, the UE may attempt to perform, for each SS, both the BD for the single port (1-port)-based transmission and the BD for the two ports based transmission. This may also be applied to following embodiments.

The RS configuration shown in FIG. 10 reduces the complexity of the channel estimation and reduces the unnecessary RS overhead, thereby advantageously increasing the data resources (for example, the resources to which the control information is mapped).

When a resource unit of the control channel in the NR (new RAT) is defined as in the legacy LTE, the scheduling restriction may be a problem. For example, when the number of REs constituting a control channel element (CCE), which is a basic unit for control information transmission, is fixed as in the legacy LTE, a partial CCE overlap may occur between the different transmission schemes as shown in FIG. 10. That is, assuming that the number of REs constituting one CCE is 4 in FIG. 10, there are 2.5 CCEs in 1 PRB (assuming 1 symbol in time) in the case of the single port (1 port)-based transmission, while there are two CCEs in 1 PRB in the case of the two ports based transmission. Therefore, when two different transmission schemes are mixed in the same resource region, one CCE for each transmission scheme may partially overlap two CCEs for another transmission scheme. Therefore, when the control information is transmitted using a control channel candidate for a first transmission scheme, CCEs constituting a control channel candidate for a second transmission scheme partially overlapping with CCEs constituting the control channel candidate for the first transmission scheme may not be used. Thus, when there are a plurality of UEs receiving the control information using different transmission schemes in the same subframe, the efficiency of resource usage may be reduced.

As one of approaches for solving such a problem, an approach is proposed in which CCE sizes are configured differently based on the transmission schemes, and CCE start locations for the transmission schemes are aligned with each other. In one example, in the case of the single port (1-port)-based transmission in FIG. 10, 50 REs are configured as one CCE, while in the case of SFBC in FIG. 10, 40 REs are configured as one CCE. In this way, resource waste problems which may occur due to partially overlapping CCEs between the different transmission schemes may be removed.

In another example for solving the above problem, an approach may be considered in which the number of REs constituting the CCE is not defined in a fixed manner. For example, when the CCE is defined using RB units (for example, REs available in the RB), a scheme may be used in which the control information is mapped to available REs (for example, a set of REs other than the RE to which the RS is mapped) in the RB. In this case, the number of REs constituting the CCE may vary depending on a RB in which the corresponding CCE is positioned.

In order to illustrate another problem that may occur in the example of FIG. 10, UE 1 receiving control information using the SFBC scheme and UE 2 receiving control information using the single port (1-port)-based transmission scheme are scheduled on the same subframe will be assumed. In this connection, for UE 1 receiving the control information using the SFBC scheme, RS must be transmitted using two ports. Therefore, there is a problem that the control information corresponding to the single port (1-port)-based transmission scheme may not be mapped to the RE corresponding to R1.

As a solution to this situation, the network may indicate a first BD region for the single port (1-port)-based transmission scheme and a second BD region for the SFBC transmission scheme via broadcast information (for example, PBCH, etc.). In this connection, the BD regions for the two transmission schemes may overlap at least partially. UE 2 may consider that in the overlapping BD region, rate-matching with respect to RS REs (for example, REs corresponding to R1) corresponding to the port 1 not used for the single port based transmission has been achieved in data mapping (for example, control information mapping). However, UE 2 may perform BD while UE 2 assumes that in a portion of the first BD region that does not overlap with the second BD region, control information for UE 2 maps to the RS REs mapped to the port 1 that is not used for the single port based transmission, and that the corresponding control information is transmitted using port 0.

This approach will be described in detail with reference to FIG. 11. The network uses the first BD region for the single port based transmission and the second BD region for the SFBC transmission within the system bandwidth using system information (for example, MIB, SIB) or RRC signaling. The UE may perform the BD while assuming a RS port indicated for a corresponding BD region. This means that two control resource sets are configured for the UE, and the single port based transmission scheme or the two ports based SFBC transmission scheme is allocated to a corresponding control resource set.

Figure 11:
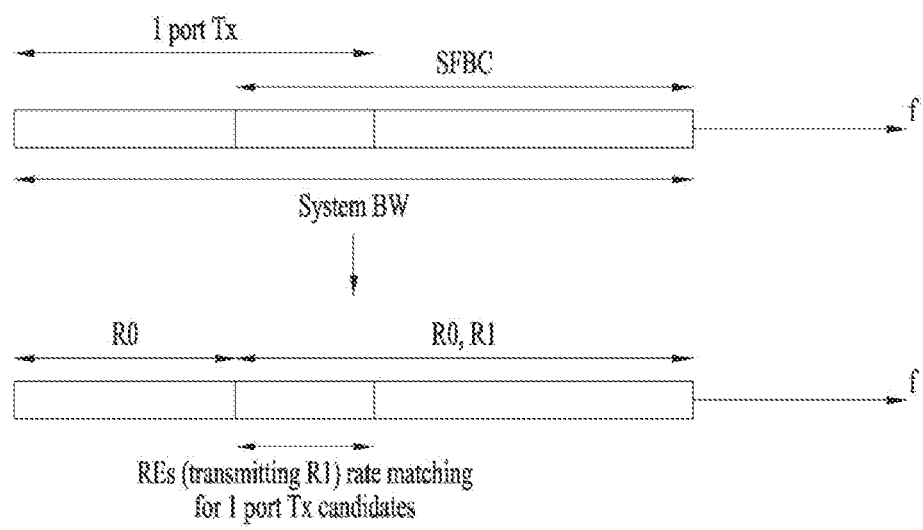

In FIG. 11, when the UE performs the BD on the control channel candidate corresponding to the single port based transmission scheme existing in the overlapping portion between the BD regions, the UE may perform the BD while assuming that rate-matching with respect to RS REs corresponding to the R1 port has been achieved in data mapping (for example, control information mapping).

Further, even when the same transmission scheme is assigned to the BD candidates (for example, the control channel candidates to be detected via the BD), resource unit sizes of the control channels to be subjected to the BD may be differently configured. For example, as in REG in LTE, in NR, a minimum resource unit constituting the DCI may be defined as the control channel unit, and the following may be assumed: for the two ports based transmission, the size of the control channel unit is 4 REs, while for the single port based transmission, the size of the control channel unit is 5 REs. In this connection, in FIG. 11, the size of the control channel unit in the overlapping portion may be configured as 4 REs, even for the single port based transmission, while, the size of the control channel unit in a non-overlapping portion of the single port based transmission region may be configured as 5 REs.

Further, in this example, different numbers of RS ports may be used between different frequency regions within the same system bandwidth. The network may indicate the number of RS ports for each frequency region using cell-specific signaling (for example, system information such as MIB/SIB, RRC signaling).

Further, the RS configuration approach as described above may be used to distinguish between the common search space (CSS) and the UE-specific search space (USS). For example, the network may instruct the UE to perform the BD while the UE assumes the SFBC transmission scheme using two ports in the CSS. Further, the network may instruct the UE to perform the BD while the UE assumes the single port based transmission scheme in the USS. Further, the network may indicate to the UE a resource region for each of the search spaces CSS and USS (for example, via system information such as MIB/SIB, RRC signaling, etc.). The UE may assume the two ports based transmission scheme in an overlapping SS region. For example, when the UE may perform the BD while assuming that when performing the BD for the single port based transmission, the rate-matching with respect to resources corresponding to the remaining port (i.e., the port not used for the BD) has been achieved.

Figure 12:
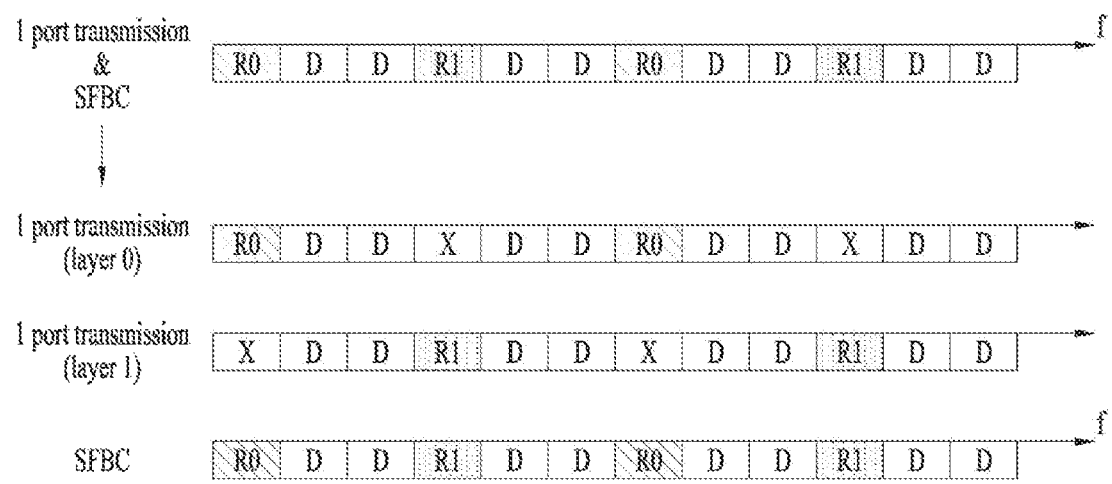

FIG. 12 illustrates a RS configuration according to another embodiment of the present disclosure.

In order to improve the efficiency of resource utilization, MU-MIMO may be considered in the control channel transmission. FIG. 12 shows RS mapping configured to apply the MU-MIMO to the FDM-based RS port multiplexing scheme. For convenience, MU-MIMO using two ports is illustrated in FIG. 12. However, more ports (for example, 4 ports) may be used or fewer ports may be used. Further, REs to which RS corresponding to each port maps may be arranged continuously.

In the case of MU-MIMO for data transmission (for example, NR-PDSCH), port information to be used in data decoding may be signaled (for example, NR-PDCCH) by the network, whereas in the case of MU-MIMO for the control channel (for example, NR-PDCCH) transmission, port information to be used in decoding of the control channel is pre-defined/signaled.

In one example of the present disclosure, an approach for MU-MIMO for the control channel transmission is proposed. In a following example, it is assumed for convenience of illustration that a maximum number of ports used for the control channel transmission is two, and MU-MIMO based on the single port-based transmission and two ports-based SFBC are applied. The present disclosure is not limited thereto. For example, the number of ports may be two or more, and an additional transmission scheme (for example, SU-MIMO) may be used.

A description about a port for which the UE should perform BD when performing a BD for the single port based transmission will be given using examples (i) to (iii) as described later.

Further, in the case of BD for SFBC-based transmission, it may be pre-defined that the UE, by default, performs the BD for the SFBC-based transmission, or alternatively, whether or not the UE should perform a BD for SFBC-based transmission may be indicated by the network.

(i) Example where the port for which the BD is to be performed is determined based on UE ID: The port (or layer) for which the BD is to be performed may be determined based on the UE ID. In one example, when RS mapping is defined as shown in FIG. 12, a UE with an even UE ID may perform BD based on the single port-based transmission for port 0 while a UE with an odd UE ID may perform BD based on the single port-based transmission for port 1. In this way, one specific port for which the single port-based transmission-based BD should be performed may be defined for each UE. Such an approach may be understood as a representative example of how the port for which the BD is to be performed is determined for individual UE using the UE-specific information.

(ii) Example where the BD is performed for all ports: in order to give flexibility to selection of resources used to transmit the control information, the UE may perform the single port-based transmission-based BD for all ports. In this case, in order to reduce complexity, the total number of times the UE has to (or may) perform the single port-based transmission-based BD may be distributed to each port. For example, when the total number of times the UE has to perform the single port-based transmission-based BD is N, the port 0 may be assigned the number of BDs of k times, while the number of BDs of N-k times may be allocated to the port 1. The ratio of the number of BDs times between the ports as distributed may be pre-defined or may be indicated by the network (for example, via RRC signaling, etc.).

(iii) Example in which a port for which BD is to be performed is designated step by step: For example, the network may specify a port (or transmission scheme) for each UE group via the CSS. Thereafter, when the UE performs the BD for the USS, the UE may perform the BD operation on the assumption of the designated port. For example, the UE performs BD for the USS using information about the port or transmission scheme as obtained from the CSS. As such, the USS and CSS may be configured stepwise (or hierarchically). In this case, scheduling flexibility may be further increased as compared to the example of the port assignment based on the UE ID as described above.

Example 2

CDM-Based RS Port Multiplexing

RS ports may be code divisional multiplexed (CDM).

When an frequency/time index of the RE used to transmit the RS corresponding to the specific port is expressed as (k, l), followings are configured according to the FDM scheme: the RS may be mapped only to RE (k, l) for a layer associated with the corresponding port, while data may be transmitted using RE (k, l) for another layer (for example, a layer that is transmitted using another port), or alternatively, the rate-matching with respect to REs (k, l) has been achieved.

Hereinafter, CDM scheme-based RS multiplexing will be described as an approach to reduce RS overhead while maintaining the same RS density between ports.

Figure 13:
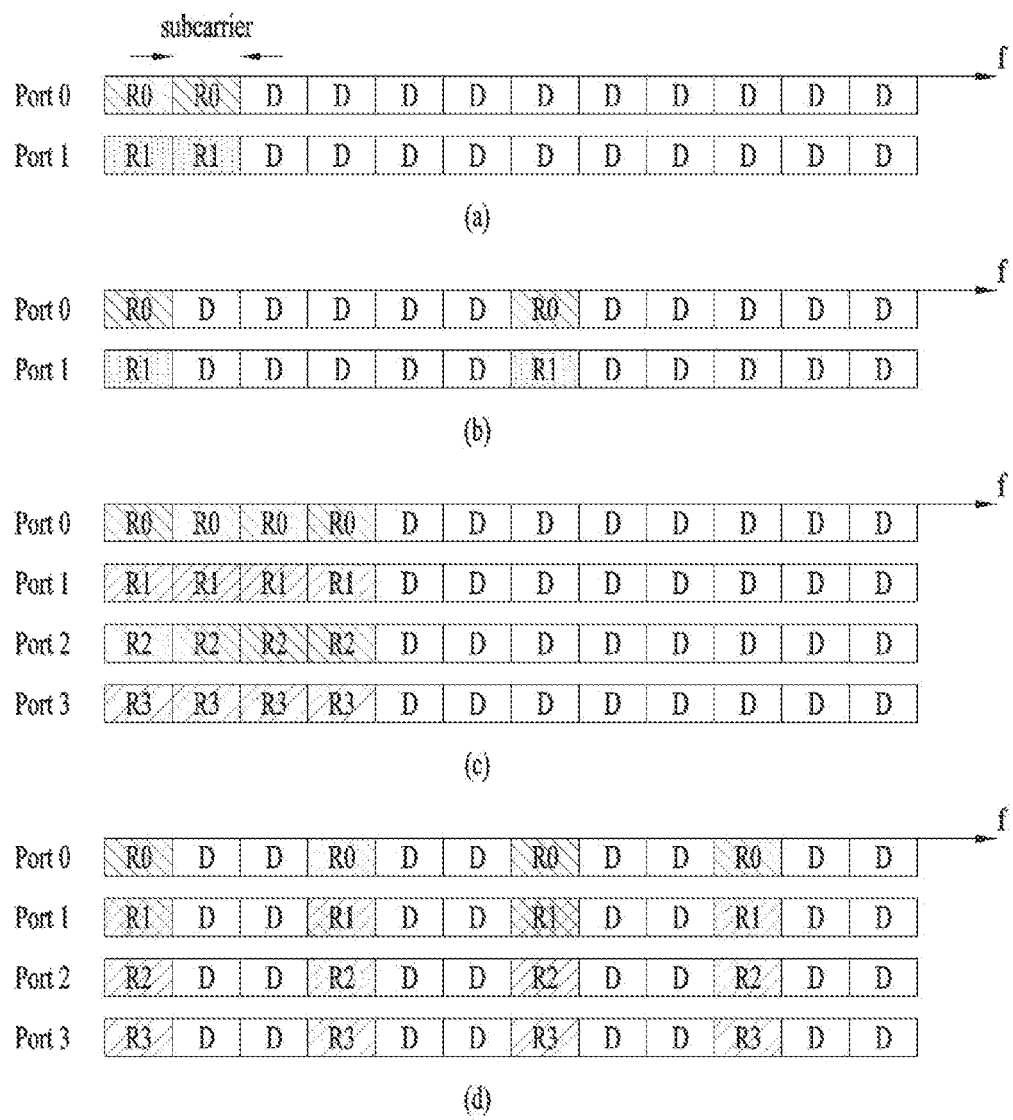
FIG. 13 illustrates a CDM-based RS configuration according to one embodiment of the present disclosure.

FIG. 13 shows an example of RS mapping using multiplexing between RS ports based on the CDM scheme.

FIGS. 13(a) and (b) show an example where two RS ports and a length-2 orthogonal cover code (OCC) are used. (a) may be an example in which RSs are continuously arranged to enhance the orthogonality of the RSs. (b) may be an example of RSs arrangement for enhancing interpolation between RSs to increase channel estimation performance. FIGS. 13(c) and (d) show a case where four RS ports are used to increase the number of users in the MU-MIMO.

In FIG. 13, one control symbol is shown for convenience, and it is assumed that two REs (for example, 2 ports CDM) or four REs (for example, 4 ports CDM) per a single RB (or 12 subcarriers) are allocated to RS. However, the present disclosure is not limited thereto. To improve channel estimation performance, an additional RE(s) may be used for RS transmission.

In FIGS. 13(c) and (d), an OCC of a length-4 may be used for CDM. The present disclosure is not limited thereto. Two OCCs, each having a length-2 may be used. When an OCC of the length-2 is used, the OCC of the length-2 may be applied on a 2 adjacent RS REs basis out of 4 RS REs in one PRB. A region in which a channel is assumed to be flat in a frequency domain when the OCC of the length-2 is used may be reduced to ½ of a region in which a channel is assumed to be flat in a frequency domain when the OCC of the length-4 is used. Thus, in the former case, a channel may be estimated more accurately in a region with a high fluctuation in a frequency domain.

As mentioned in the FDM-based example, it may be difficult to dynamically signal the configuration of the control channel. For this reason, the network may indicate the port for which the BD for the control channel is to be performed to each UE by using system information (for example, MIB, SIB) or RRC signaling. Alternatively, as previously proposed, a port or layer for which each UE must perform a BD may be determined in association with a UE ID or the like. Alternatively, the network may distribute a predetermined number of BD times to all ports (or all layers) so that the BD is performed on all ports (or all layers).

When the RS configuration as shown in FIG. 13 is used, the USS and CSS may be identified/defined by a port index (or OCC index). For example, in FIG. 13(d), a layer associated with a port 0 is allocated to the CSS (for example, via MIB, SIB, RRC signaling, etc.) by the network. The network may allocate layers associated with the ports 1, 2, and 3 to the USS.

Alternatively, a port to be used for each SS may be pre-defined. For example, in FIG. 13(d), the port 0 may be pre-defined for CSS, while the ports 0, 1, 2, and 3 may be pre-defined for USS. That is, the port 0 may be used for both USS and CSS. Alternatively, the ports 0 and 1 may use the SFBC when they are used for the CSS, while the ports 2 and 3 may use the single port-based transmission when they are used for the USS.

In this way, the single port-based transmission-based MU-MIMO may also be implemented in the CDM scheme. In this connection, a port for which each UE performs the BD may be determined via upper layer signaling or may be determined based on UE ID or the like. Alternatively, a preconfigured number of BD times may be distributed for all ports for which the USS may be configured.

Figure 14:
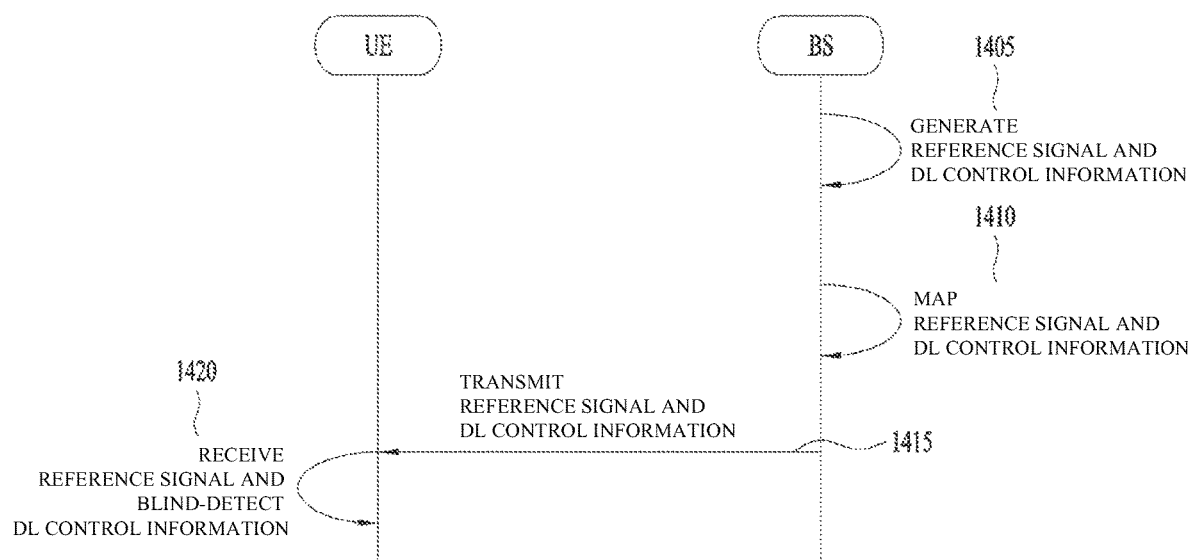
FIG. 14 illustrates a method for transmitting or receiving downlink control information according to one embodiment of the present disclosure.

FIG. 14 illustrates a flow chart of a method for transmitting and receiving control information according to one embodiment of the present disclosure. Overlapping descriptions with the above-described descriptions will be omitted.

Referring to FIG. 14, a base station generates control information of an user equipment a reference signal (1405). The reference signal may be a reference signal used for demodulation of the control information of the user equipment. The base station maps the control information of the user equipment and the reference signal to a subframe (1410). The subframe may be a self-contained subframe having all of a downlink control symbol, a data symbol, and an uplink control symbol. The control information of the user equipment, and the reference signal may be mapped to the downlink control symbol.

The base station transmits the reference signal and control information (1415). Here, the reference signal and control information may be transmitted based on one of a plurality of transmission schemes. The multiple transmission schemes may include a first transmission scheme where a single antenna port is used for the reference signal transmission, and a second transmission scheme where multiple antenna ports are used to transmit the reference signal. The reference signal resources for multiple antenna ports based on the second transmission scheme may be frequency division multiplexed. The first transmission scheme may be a single port beamforming scheme, while the second transmission scheme may be a transmission diversity scheme.

A resource region for the first transmission scheme and a resource region for the second transmission scheme may overlap at least partially. In the overlapping resource region, the base station may transmit the reference signal using the second transmission scheme. Considering that in the overlapping resource region, the reference signal is transmitted using the second transmission scheme, the base station may rate-match the control information of the user equipment in the generation and mapping of the control information.

The user equipment receives the reference signal via at least one of the multiple antenna ports of the base station, and, then, the user equipment performs blind detection of the control information (1420). The user equipment may perform the blind detection (BD) of the control information based on at least one of the first transmission scheme in which a single antenna port is used for transmission of the reference signal, and the second transmission scheme in which multiple antenna ports are used to transmit the reference signal. Alternatively, the user equipment may perform the blind detection based on both the first transmission scheme and the second transmission scheme. Alternatively, the user equipment may perform the blind detection only based on one of the first transmission scheme and the second transmission scheme as indicated by the base station.

When the user equipment performs the blind detection based on the first transmission scheme, the user equipment may perform the blind detection, assuming that the reference signal is transmitted using the second transmission scheme in the overlapping resource region. When the user equipment performs the blind detection based on the first transmission scheme, the user equipment may assume that the control information of the user equipment has been rate-matched with respect to all of the reference signal resources in the overlapping resource region. The user equipment may determine that one of the plurality of antenna ports as identified using the identifier of the user equipment is a single antenna port for the first transmission scheme.

The user equipment may perform 'N' times blind detection attempts based on the first transmission scheme for the first port among multiple antenna ports. The user equipment may perform 'M' times attempt of blind detection based on the first transmission scheme for the second port among the multiple antenna ports. A ratio between 'N' and 'M' may be signaled from the base station.

The channel estimate for the single antenna port as acquired from the reference signal may be reused when the user equipment performs blind detection based on the second transmission scheme.

Figure 15:
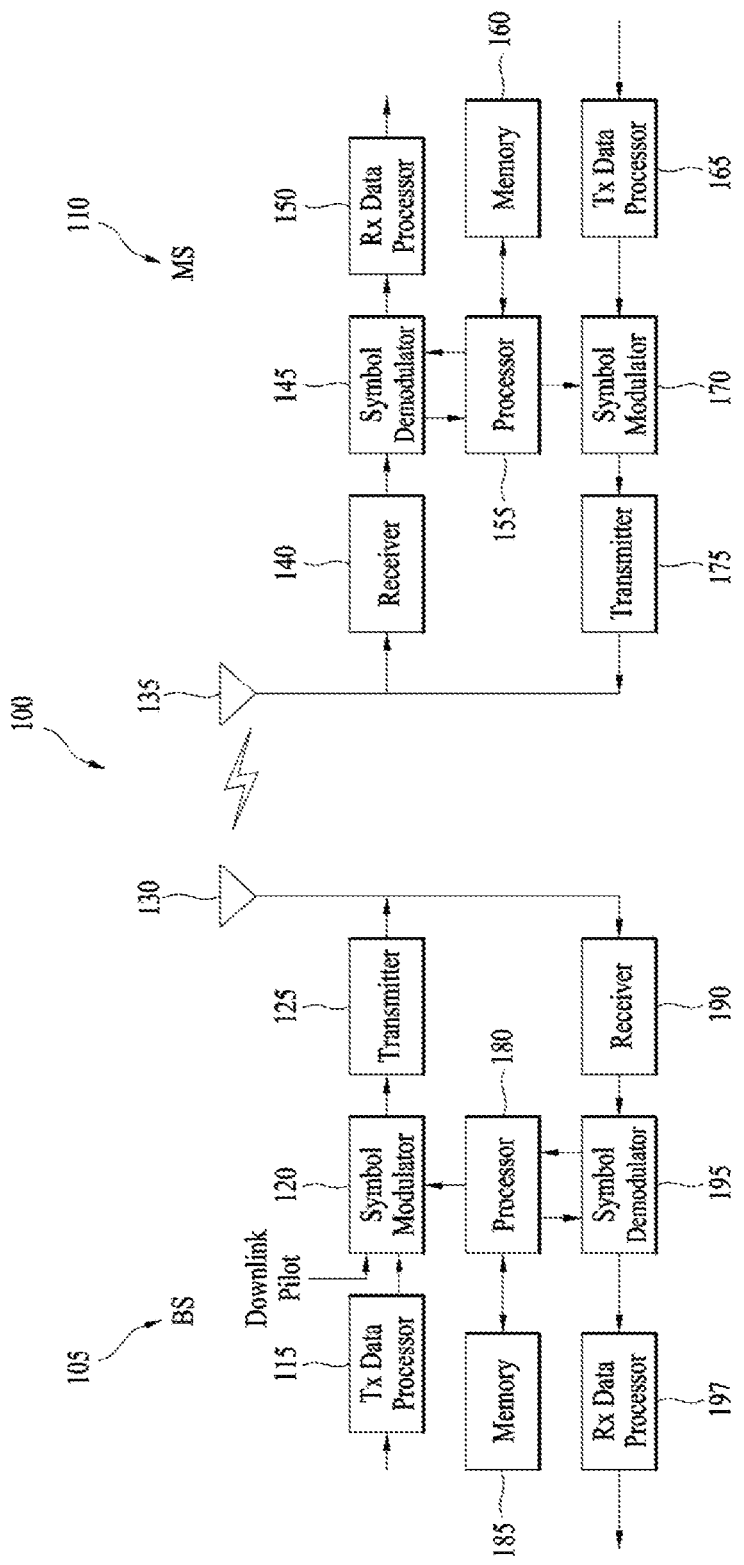
FIG. 15 illustrates a user equipment and a base station according to one embodiment of the present disclosure.

FIG. 15 is a block diagram for configurations of an eNB 105 and a user equipment 110 in a wireless communication system 100.

Although one eNB 105 and one user equipment 110 (D2D user equipment included) are shown in the drawing to schematically represent a wireless communication system 100, the wireless communication system 100 may include at least one eNB and/or at least one user equipment.

Referring to FIG. 15, an eNB 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the eNB/user equipment 105/110 includes one antenna 130/135 in the drawing, each of the eNB 105 and the user equipment 110 includes a plurality of antennas. Therefore, each of the eNB 105 and the user equipment 110 of the present disclosure supports an MIMO (multiple input multiple output) system. And, the eNB 105 according to the present disclosure may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (for example, amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the eNB and then provides the received signal to the receiver 140. The receiver 140 adjusts the received signal (for example, filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the eNB 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the eNB 105 via the antenna 135.

In the eNB 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/eNB 110/105 directs operations (for example, control, adjustment, management, etc.) of the user equipment/eNB 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present disclosure as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155/180 or saved in the memory 160/185 to be driven by the processor 155/180.

Layers of a radio protocol between a user equipment/eNB and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and an eNB may be able to exchange RRC messages with each other through a wireless communication network and RRC layers.

The above-mentioned embodiments correspond to combinations of elements and features of the present disclosure in prescribed forms. And, it is able to consider that the respective elements or features are selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present disclosure has been described and illustrated herein with reference to the preferred embodiments thereof, it will be apparent to those skilled in the art that various modifications and variations can be made therein without departing from the spirit and scope of the disclosure. Thus, it is intended that the present disclosure covers the modifications and variations of this disclosure that come within the scope of the appended claims and their equivalents.

INDUSTRIAL APPLICABILITY

The embodiments of the present disclosure mentioned in the foregoing description are applicable to various kinds of mobile communication systems.

What is claimed is:

1. A method for receiving control information by a user equipment in a wireless communication system, the method comprising:
receiving a reference signal via at least one of multiple antenna ports of a base station; and
performing blind detection for control information of the user equipment based on at least one of a first transmission scheme in which a single antenna port is used for the reference signal and a second transmission scheme in which multiple antenna ports are used for the reference signal,
wherein a resource region for the first transmission scheme overlaps at least partially with a resource region for the second transmission scheme,
wherein when the user equipment performs the blind detection based on the first transmission scheme, the user equipment performs the blind detection by assuming that the reference signal is transmitted based on the second transmission scheme in the overlapping resource region, and
wherein channel estimation for the single antenna port acquired from the reference signal is reused for performing blind detection based on the second transmission scheme by the user equipment.

2. The method according to claim 1,
wherein reference signal resources of the multiple antenna ports for the second transmission scheme are frequency division multiplexed, and
wherein when the user equipment performs the blind detection based on the first transmission scheme, the user equipment assumes that the control information of the user equipment has been rate-matched with respect to all of the reference signal resources in the overlapping resource region.

3. The method according to claim 1, wherein the user equipment determines that one of the multiple antenna ports that is specified using an identifier of the user equipment is the single antenna port for the first transmission scheme.

4. The method according to claim 1,
wherein the user equipment performs N times of blind detection attempts based on the first transmission scheme for a first port among the multiple antenna ports, and performs M times of blind detection attempts based on the first transmission scheme for a second port among the multiple antenna ports, and
wherein a ratio between N and M is signaled from the base station.

5. The method according to claim 1, wherein the reference signal and the control information are received on a self-contained subframe having all of a downlink control symbol, a data symbol, and an uplink control symbol.

6. The method according to claim 1,
wherein the user equipment performs the blind detection based on both the first transmission scheme and the second transmission scheme; or
wherein the user equipment performs the blind detection based on one of the first transmission scheme or the second transmission scheme indicated by the base station.

7. The method according to claim 1, wherein the first transmission scheme is a single port beamforming scheme, and the second transmission scheme is a transmission diversity scheme.

8. A user equipment for receiving control information, the user equipment comprising:
a receiver for receiving a reference signal via at least one of multiple antenna ports of a base station; and
a processor for performing blind detection for control information of the user equipment based on at least one of a first transmission scheme in which a single antenna port is used for the reference signal and a second transmission scheme in which multiple antenna ports are used for the reference signal,
wherein a resource region for the first transmission scheme overlaps at least partially with a resource region for the second transmission scheme,
wherein when processor performs the blind detection based on the first transmission scheme, the processor performs the blind detection by assuming that the reference signal is transmitted based on the second transmission scheme in the overlapping resource region,
wherein channel estimation for the single antenna port acquired from the reference signal is reused for performing blind detection based on the second transmission scheme by the user equipment.

9. A method for transmitting control information by a base station in a wireless communication system, the method comprising:
transmitting a reference signal via at least one of multiple antenna ports; and
transmitting control information of an user equipment based on at least one of a first transmission scheme in which a single antenna port is used for the reference signal and a second transmission scheme in which multiple antenna ports are used for the reference signal,
wherein a resource region for the first transmission scheme overlaps at least partially with a resource region for the second transmission scheme,
wherein the base station rate-matches the control information of the user equipment, considering that the reference signal is transmitted based on the second transmission scheme in the overlapping resource region, and
wherein channel estimation for the single antenna port acquired from the reference signal is reused for performing blind detection based on the second transmission scheme by the user equipment.

10. The method according to claim 9,
wherein reference signal resources of the multiple antenna ports for the second transmission scheme are frequency division multiplexed,
wherein the base station rate-matches the control information of the user equipment with respect to all of the reference signal resources in the overlapping resource region.

11. The method according to claim 9, wherein when the first transmission scheme is used for transmitting the control information, the base station transmits the control information of the user equipment via one of the multiple antenna ports specified using an identifier of the user equipment.

12. The method according to claim 9, wherein the base station instructs the user equipment to:
perform N times of blind detection attempts based on the first transmission scheme for a first port among the multiple antenna ports;
perform M times of blind detection attempts based on the first transmission scheme for a second port among the multiple antenna ports.

13. The method according to claim 9, wherein the reference signal and the control information are transmitted on a self-contained subframe having all of a downlink control symbol, a data symbol, and an uplink control symbol.

14. The method according to claim 9, wherein the first transmission scheme is a single port beamforming scheme, and the second transmission scheme is a transmission diversity scheme.

* * * * *